United States Patent [19]

Tsen et al.

[11] 3,919,434

[45] *Nov. 11, 1975

[54] SHORTENING SPARING PROCESS FOR CHEMICALLY LEAVENED BAKED AND FRIED PRODUCTS AND COMPOSITIONS FOR PREPARING THE SAME

[75] Inventors: Cho C. Tsen; William J. Hoover, both of Manhattan, Kans.

[73] Assignee: The Kansas University Research Foundation, Manhattan, Kans.

[ * ] Notice: The portion of the term of this patent subsequent to Oct. 20, 1990, has been disclaimed.

[22] Filed: Nov. 9, 1973

[21] Appl. No.: 414,234

Related U.S. Application Data

[63] Continuation-in-part of Ser. No. 78,237, Oct. 5, 1970, Pat. No. 3,773,521.

[52] U.S. Cl. .............................. 426/553; 426/551
[51] Int. Cl.$^2$ .................. A21D 10/04; A21D 10/00; A21D 2/16; A21D 2/26
[58] Field of Search ........... 426/153, 155, 156, 345, 426/551, 553

[56] References Cited
UNITED STATES PATENTS 3,141,030    7/1964    Buddemeyer et al. ............ 426/155 X

OTHER PUBLICATIONS

Tenney et al., "Sodium Stearoyl-2 Lactylate," The Bakers Digest, Vol. 42, Dec. 1968, pp. 38–42.

*Primary Examiner*—James R. Hoffman
*Attorney, Agent, or Firm*—Schmidt, Johnson, Hovey & Williams

[57] ABSTRACT

A method of substantially decreasing the shortening content normally required in chemically leavened wheat flour based doughs or batters which comprises incorporating into the dough or batter in lieu of the shortening omitted, from about 0.1 to 3% by weight, based upon the flour content therein, of an additive selected from the group consisting of the sodium and calcium salts of acyl lactylates of $C_{14}$–$C_{22}$ fatty acids. The preferred additives are sodium stearoyl lactylate and calcium stearoyl lactylate, each being utilized at a concentration of about 0.5% by weight. In optional procedures, a protein supplement such as soy flour can be added to the dough or batter products without noticeably affecting the appearance and taste characteristics of the finished product.

12 Claims, No Drawings

SHORTENING SPARING PROCESS FOR CHEMICALLY LEAVENED BAKED AND FRIED PRODUCTS AND COMPOSITIONS FOR PREPARING THE SAME

This application is a continuation-in-part of application Ser. No. 78,237, filed Oct. 5, 1970, now U.S. Pat. No. 3,773,521 and entitled SHORTENING SPARING PROCESS FOR WHEAT FLOUR BASED BAKED OR FRIED DOUGH PRODUCTS AND DOUGHS PRODUCED THEREBY. The subject matter of the parent application is expressly incorporated herein by reference.

This invention relates to a process for substantially decreasing the amount of shortening normally required in chemically leavened, wheat flour based doughs or batters without adversely affecting the appearance and taste characteristics of the finished products. More particularly, it is concerned with such a process as well as premixes and compositions useful in connection therewith for the production of protein fortified or unfortified baked or fried goods which employ a constituent selected from the group of the sodium or calcium salts of acyl lactylates of $C_{14}$-$C_{22}$ fatty acids as an additive in lieu of the shortening content omitted or at reduced levels from the dough or batter formulation. In preferred forms, sodium or calcium stearoyl-2-lactylate is utilized as the shortening sparing agent, and a protein supplement such as soy flour can optionally be added to the dough or batters to increase the nutritional content thereof.

Wheat flour based goods such as breads, cookies, crackers, biscuits and cakes are staple foods in many countries of the world because of their relatively high caloric value, ready availability of wheat flour at an economical price, and the attractive organoleptic and appearance properties of the food products. Wheat flour based products of this type typically contain water, salt, sugar, shortening and dough conditioning agents in addition to the wheat flour base, with shortening conventionally being added to improve the volume, organoleptic and taste characteristics of the final baked or fried product.

As is well understood in the art, wheat flour based products of the class described are deemed to comprise two separate categories, namely yeast leavened or chemically leavened doughs or batters. Conventional wheat flour based breads which contain yeast as a leavening agent therein are a prime example of products of the first mentioned class, and these are generally characterized by a semi-rigid, but pliable dough. Semi-rigid doughs of this type are generally necessary in order to provide a matrix of protein which entraps small cells of carbon dioxide produced during fermentation by the yeast. When such a dough is placed in an oven for baking the $CO_2$ trapped therein expands and the protein and starch matrix of the dough becomes progressively denatured and gelainized and more rigid. At the end of the cooking thereof such as baking or frying, the entrapped gas has escaped and a self-sustaining, finished raised bread product remains.

On the other hand, chemically leavened products are generally of two types, batters and underdeveloped doughs, and are characterized by the lack of a semi-rigid protein matrix. For example, a conventional cake batter, which is a high moisture, semi-fluid, pourable suspension containing 70 to 80% water, cannot effectively be leavened by yeast, because during fermentation thereof the $CO_2$ developed quickly escapes to the atmosphere and thus cannot serve to raise the product during baking. Accordingly, it is necessary with such batter products to thoroughly admix the ingredients thereof and rely upon relatively quick raising in the oven during baking. Hence, chemically leavened systems employ additives such as baking powder which produce the requisite raising gas at a time substantially coincident with the heating, drying out and denaturization and gelatinization of the protein and starch components of the batter. As can be appreciated, timing of the gas-producing action of the chemical leavening agent is exceedingly critical in systems of this type by virtue of the lack of a semi-rigid matrix in the batter.

Similarly, cookie or cracker doughs do not have the requisite matrix characteristics which allow yeast to be an effective leavening agent therein. This stems from the fact that these doughs are relatively dry and cannot be mixed and kneaded as extensively as in the case of bread doughs thus resulting in stiff dough systems which are generally referred to in the art as "underdeveloped." In other words, underdeveloped doughs are not subjected to adequate mixing to cause the proteins and starches therein to become pliable and stretchable, but rather these doughs are of a stiff, dry, non-pliable consistency. Accordingly, it is necessary to employ chemical leavening agents in such cookie or cracker doughs in order to provide a degree of spreading rather than raising which aids in the formulation of desirable thin, flat, end products.

As alluded to previously, shortening is usually present in both yeast and chemically leavened food products. However, a special problem is posed with respect to the latter formulations because of the relatively large quantities of shortening normally employed therein. For example, many conventional cake batters contain up to 50% by weight (baker's weight) shortening, while on the same basis yeast leavened breads in many instances contain 3% or less by weight shortening. Similarly, cookies can contain 5 to 98% shortening by weight, and crackers are in many instances approximately 10% by weight shortening, all calculated as baker's weight. Therefore, in view of the fact that shortening is several times as expensive as the base wheat flour material, any reduction in shortening content of chemically leavened doughs or batters represents a significant commercial breakthrough. This is particularly true if it is possible to substantially lower the shortening content of such products while nevertheless maintaining substantially identical or improved taste and appearance qualities, and if the additive employed for this purpose is not itself prohibitively expensive.

Moreover, it is desirable in many instances to increase the nutritional content of the wheat flour based chemically leavened products outlined, particularly from a protein standpoint. However, attempts to incorporate protein supplements into wheat flour based food products, and especially those of the chemically leavened variety, have heretofore met with little success, particularly in conjunction with an attempt to simultaneously decrease the shortening level of the dough or batter formulations. Soy flour for example is an especially attractive protein supplement for chemically leavened products such as crackers, biscuits and cakes because of the high content of good nutritional quality protein in soy flour. Also, soy flour is especially valuable as an additive by virtue of the fact that it contains from about 3.2 to 3.8% lysine as compared with 0.375% in wheat flour. Thus, with the addition of 12 grams of soy flour to 100 grams of wheat flour, the lysine content will be more than doubled to a value of from 0.76 to 0.83%. The resulting product thus provides an exceptional vehicle for nutritional improvement of the human diet.

Supplementation of the protein content of wheat flour based, chemically leavened batters or doughs to a level to significantly improve nutrition has not heretofore been successful because of the adverse affect on the quality of the food product attributable to the supplement added, not only from the organoleptic standpoint, but also from the undesirable appearance, physical quality and decreased shelf-life of the resulting goods. These problems are further compounded when efforts are made to limit the shortening content of the dough or batter formulation. In order for shortening sparing and protein supplementation to be commercially practical, the additive permitting these objectives to be carried out must be economical, uniform in quality and of properties which do not result in a significant change in the physical and nutritional properties of the dough or batter.

It has now been discovered that by incorporation of from 0.1 to 3% by weight, based upon the weight of wheat flour, of either the sodium or calcium salts of acyl lactylates of $C_{14}-C_{22}$ fatty acids (preferably sodium stearoyl-2-lactylate or to a slightly lesser degree calcium stearoyl-2-lactylate) in chemically leavened, wheat flour based dough or batter formulations, not only may the shortening required be substantially decreased, but at the same time a protein supplement may be added to the composition in an amount to improve the nutritive quality of the resultant products without a consequent loss in final product appearance or organoleptic characteristics. In particular, the shortening content of such batters and doughs can be decreased by an amount of up to about 35% of that normally present in the formulations, which as can be appreciated represents a substantial saving to commercial scale producers. This result is enhanced by virtue of the fact that the defined additives are effective at a level (preferably about 0.5% by weight) where the cost thereof is substantially less than the price of shortening omitted in a given dough or batter formulation. Moreover, a number of highly advantageous protein supplements can be added to the formulations including soy flour, soy isolates, nonfat milk solids, whey products, fish protein concentrates, cotton seed flour, chick-pea flour, sesame seed flour, corn-soy milk blend flour, wheat protein concentrate, wheat gluten, defatted wheat germ, Torula yeast, wheat soy blend flour, edible single cell proteins compatible with wheat flour for baking or frying purposes, and mixtures thereof.

It is therefore the primary object of this invention to provide a novel process for drastically lowering the amount of shortening required in wheat flour based, chemically leavened doughs or batters by addition of a sodium or calcium salt of the acyl lactylates of $C_{14}-C_{22}$ fatty acids which in the quantities employed costs less than the shortening omitted and serves the added function of allowing a protein supplement to be introduced into the formulation without changing the desirable properties of the food product.

It is a further important object of the invention to provide a method of substantially lowering the shortening requirements of chemically leavened, wheat flour based doughs or batters which may be carried out without altering in any significant way the processing conditions required for preparation of the food products therefrom, in the baking or frying processes themselves, or in the equipment needed for mixing and processing of the dough or batter.

Yet another object of the invention is to provide chemically leavened, wheat flour based dough or batter premixes or compositions which contain abnormally low amounts of shortening therein by conventional standards and can be supplemented by the addition of protein-containing additives without in any way detracting from the taste and organoleptic properties of the final product.

The following examples will illustrate the broad applicability of the invention disclosed herein. It is to be understood that the specific formulas and tests referred to hereunder are not to be construed as limiting the applicability of the lactylate additives to any particular types of chemically leavened, wheat flour based doughs or batters, but instead should be interpreted as exemplary of the large number of such goods which can be produced in accordance with the concepts hereof.

EXAMPLE I

A series of baking tests employing wheat flour based, chemically leavened cake batters were conducted according to the Official Method of the American Association of Cereal Chemists (AACC Method 10-90, Cereal Laboratory Methods 7th Ed. AACC. St. Paul, 1962). The following basic formula was employed in each of these tests:

TABLE I

Basic Cake Formula

| Ingredient | Amount g. | % (flour basis) |
|---|---|---|
| Flour | 200.0 | 100.0 |
| Sugar | 280.0 | 140.0 |
| Shortening | 100.0 | 35.0 |
| Nonfat dry milk | 24.0 | 12.0 |
| Frozen egg whites | 18.0 | 9.0 |
| Salt | 6.0 | 3.0 |
| Baking powder | 12.0 | 6.0 |

The above listed ingredients were mixed to form a batter with varying amounts of shortening and additive therein in the conventional manner in an appropriate mixer and cooked in an oven until done. The volume of all of the resulting cakes was then measured by the rape seed displacement method.

The results of each of the individual tests wherein varying amounts of shortening and sodium stearoyl-2-lactylate (SSL) were employed is given below in Table II. Moreover, a number of test results are shown wherein varying amounts of soy flour were added to the basic formulation of Table I as a protein supplement.

TABLE II

Effects of Soy Flour, Shortening, and SSL Levels on Cakes' Volume*

| Soy Flour % | Shortening % | SSL % | Average Volume C.C. |
|---|---|---|---|
| 0 | 35 | 0 | 1150 |
| 0 | 35 | 0.5 | 1275 |
| 0 | 30 | 0 | 1075 |
| 0 | 30 | 0.5 | 1235 |
| 0 | 25 | 0 | 1045 |
| 0 | 25 | 0.5 | 1200 |
| 12 | 35 | 0 | 1075 |
| 12 | 35 | 0.5 | 1125 |
| 12 | 30 | 0 | 1100 |

TABLE II-continued

Effects of Soy Flour, Shortening, and SSL Levels on Cakes' Volume*

| Soy Flour % | Shortening % | SSL % | Average Volume C.C. |
|---|---|---|---|
| 12 | 30 | 0.5 | 1125 |
| 12 | 25 | 0 | 1105 |
| 12 | 25 | 0.5 | 1115 |

*All % given on flour weight basis (baker's weight)

As can be appreciated from a study of Table II, all cakes, regular and soy fortified, with 0.5% SSL were found to have a larger volume than those without SSL at a comparative shortening level. In fact, the volume of regular and soy fortified cakes containing 25% shortening and 0.5% SSL were larger than that of cakes containing 35% shortening. This means that the addition of 0.5% SSL can significantly reduce the shortening requirement of cakes.

EXAMPLE II

A number of soda crackers were prepared according to the average formula outlined in *Cookie and Cracker Technology* by Matz (AVI Publishing Co., Westport, Conn., 1968), with slight modifications as set forth below in Table III.

TABLE III

SODA CRACKER FORMULA

Sponge Portion

| Flour | 60 g. |
|---|---|
| Shortening | Variable |
| Protease | 2 ml. (1 tablet/1 L) |
| α-amylase | 2 ml. (1 tablet/1 L) |
| Water | Variable |
| Yeast | 20 ml. (0.2%) |
| Mixing | 4 min. |

Dough Portion

| Flour | 40 g. |
|---|---|
| Malt syrup | 1.0 g. |
| Soda | 0.7 g. |
| Salt | 1.2 g. |
| Mixing | 7.0 min. |

The sponge portion containing variable amounts of shortening and water were admixed in a conventional Hobart mixer and allowed to ferment for a period of 18 hours and 30 minutes at approximately 85° F and 85% relative humidity. Following this fermentation, the dough portion containing the soda chemical leavening agent was admixed and incorporated into the yeast leavened sponge portion. After thorough admixing of these two portions to insure a uniform consistency, the resultant dough was allowed to sit for a period of 5 hours and 30 minutes at approximately 85° F and 85% relative humidity.

Following the above described treatment, the dough was sheeted on a conventional Anets sheeter a number of times, and pressed into a cracker form. The cracker dough was thereafter baked in an oven at about 500° F for about 1½ minutes or until the crackers were lightly browned.

In general, it is recognized in the art that the quality of crackers may be relatively uniformly evaluated by their weight. The lighter the weight, the thinner the cracker layers will be; and eating quality is generally much improved when it is composed of thin layers. Table IV documents the results obtained from weighing 12 pieces of the crackers produced in each run. As can be seen, in a number of cases 6 or 12% by weight soy flour was incorporated into the composition as a protein additive, and these results are likewise set forth in Table IV.

TABLE IV

EFFECTS OF SOY FLOUR, SHORTENING AND SSL LEVELS ON CRACKER'S WEIGHT (QUALITY)*

| Soy Flour % | Shortening % | SSL % | Cracker Wt. (12 pieces) g. |
|---|---|---|---|
| 0 | 6 | 0 | 20.5 |
| 0 | 6 | 0.5 | 18.8 |
| 0 | 9 | 0 | 19.5 |
| 0 | 9 | 0.5 | 17.9 |
| 6 | 6 | 0 | 25.6 |
| 6 | 6 | 0.5 | 21.4 |
| 6 | 9 | 0 | 26.2 |
| 6 | 9 | 0.5 | 22.3 |
| 12 | 6 | 0 | 24.1 |
| 12 | 6 | 0.5 | 22.2 |
| 12 | 9 | 0 | 24.4 |
| 12 | 9 | 0.5 | 19.9 |

*All % given on flour weight basis (baker's weight)

The test results tabulated in Table IV show that both shortening and SSL can reduce the weight and therefore improve the quality of crackers, but SSL is in general more effective in exerting the reducing action. The weight data also indicates that crackers with 6% shortening and 0.5% SSL are better than those with 9% shortening. This observation is confirmed by results on high-protein crackers made from wheat flour fortified with 6 or 12% defatted soy flour. Furthermore, organoleptic tests confirm that crackers containing SSL taste much better (i.e., are crispier) than those without SSL. In short, the test results indicate that SSL can spare shortening normally required in crackers and simultaneously improve the eating quality thereof, even those of the high protein variety.

EXAMPLE III

In order to confirm the advantages of using additives in accordance with the present invention in chemically leavened cookies, the following studies were made.

A series of baking tests were conducted according to the Standard AACC Method 10-50 for testing the baking quality of cookie flour (spread-factor test) using wheat flours and blends thereof fortified with various levels of soy flour. The following formula was followed, unless otherwise indicated:

TABLE V

COOKIE FORMULA

| Ingredients | Weight g. | Percentage (flour weight basis) |
|---|---|---|
| Wheat flour or a blend of wheat-soy flours | 225.0 | 100.00 |
| Sugar | 130.0 | 58.04 |
| Hydrogenated vegetable shortening | 62.7 | 28.00 |
| Salt | 2.1 | 0.93 |
| Sodium bicarbonate | 2.5 | 1.12 |
| Water | Vary | Vary |
| Suspension of nonfat dry milk* | 40.0 | 17.85 |

*28.2 g. of spray-dried, nonfat dry milk was dissolved in 150 ml. water. 40 ml. of water was used instead of the milk suspension for making soy-fortified cookies.

Following mixing of the above listed ingredients in the conventional manner to form a relatively stiff dough, cookies were cut therefrom using a 70 mm. cookie cutter. The cookies were then oven baked until done and allowed to cool. The spread ratio (W/T, where W is the average diameter and T the average thickness) was then calculated for the various cookies by determining the width, thickness and weight of six cookies on an average basis. In each case six cookies were laid end to end for width measurement and stacked for thickness measurements. In addition, the baking tests were repeated at least once on a different day to substantiate results.

In order to further test the lactylate additives of the present invention, four different wheat flour were employed in the cookie tests. The chemical characteristics of those wheat flours are given below in Table VI.

TABLE VI

| | WHEAT FLOUR ANALYSIS | | | |
|---|---|---|---|---|
| | Moisture % | Protein % | Ash % | Crude Lipid % |
| Flour I | 12.5 | 10.1 | 0.42 | — |
| Flour II | 12.5 | 8.6 | 0.41 | — |
| Arthur flour | 12.7 | 10.4 | 0.37 | 0.8 |
| Logan flour | 12.6 | 10.7 | 0.37 | 0.8 |

Analysis of the wheat flours was determined as described in AACC Method except for the fat which was determined by AOCS Method (Aa 4-38) using petroleum ether as the extracting solvent.

Soft wheat flour I was a commercially available cookie flour, as was wheat flour II. Arthur and Logan wheats (two soft wheat varieties) were supplied by the Soft Wheat Quality Laboratory, USDA, and milled on a Miag Multomat mill.

In the first test, the effects of various shortening levels and SSL on the spread ratio of cookies prepared from wheat flour I fortified with 12% defatted soy flour was determined in accordance with the above outlined procedures. The results of these tests were collected in the following Table VII.

confirm the improving effect of SSL with different kinds of wheat flour.

Inclusion of SSL in cookies not only permits preparation thereof with significantly lower amounts of shortening therein but also improves the cookies' quality, reduces the caloric value thereof, and in some instances lowers production costs.

In order to determine the various levels of effectiveness of SSL, a series of cookie tests identical to those previously described were preformed wherein various levels of SSL were employed in cookies containing two different amounts of shortening (22 and 28% by weight respectively). Moreover, the effect of SSL on cookies supplemented with defatted soy flour was also determined. The results of these tests are documented in Table VIII.

TABLE VIII

SPREAD RATIO (W/T) OF COOKIES PREPARED FROM FLOUR II AND FLOUR II FORTIFIED WITH 12% DEFATTED SOY FLOUR USING INDICATED LEVELS OF SSL AND TWO LEVELS (22 and 28%) OF SHORTENING*

| Additive % | Shortening % | Flour II | Flour II + 12% defatted soy flour |
|---|---|---|---|
| 0 | 22 | 7.4 | 6.4 |
| 0.25% SSL | 22 | 8.5 | 6.7 |
| 0.50% SSL | 22 | 8.7 | 6.7 |
| 1.00% SSL | 22 | 9.3 | 6.9 |
| 1.50% SSL | 22 | 9.4 | 7.1 |
| 0 | 28 | 8.8 | 7.0 |
| 0.25% SSL | 28 | 9.4 | 7.3 |
| 0.50% SSL | 28 | 10.0 | 7.4 |
| 1.00% SSL | 28 | 10.3 | 7.6 |
| 1.50% SSL | 28 | 10.6 | 7.6 |

*all % given on flour weight basis (baker's weight)

EXAMPLE IV

TABLE VII

SPREAD RATIOS OF COOKIES AS AFFECTED BY SHORTENING VARIATIONS AND SSL ADDITIONS TO FLOUR I, II, LOGAN AND ARTHUR FLOURS

| Shortening *% | Regular Cookies (I) | | Soy-Fortified Cookies (I) | | Regular Cookies (II) | | Regular Cookies (Arthur) | | Regular Cookies (Logan) | |
|---|---|---|---|---|---|---|---|---|---|---|
| | No SSL | 0.5% SSL | No SSL | 0.5% SSL | No SSL | 0.5% SSL | No SSL | 0.5% SSL | No SSL | 0.5% SSL |
| 12 | — | — | — | — | 5.2 | 6.6 | 5.6 | 6.9 | 5.0 | 6.8 |
| 16 | 6.18 | 6.93 | 5.19 | 5.31 | 6.7 | 7.8 | 7.0 | 8.1 | 6.8 | 8.4 |
| 20 | 6.47 | 7.55 | 5.64 | 5.68 | 7.0 | 8.4 | 8.0 | 8.4 | 8.4 | 9.3 |
| 24 | 6.97 | 7.84 | 6.11 | 6.29 | 9.0 | 8.9 | 8.9 | 10.2 | 9.5 | 9.9 |
| 28 | 7.46 | 8.46 | 6.54 | 6.87 | 8.5 | 10.0 | 10.4 | 10.7 | 10.0 | 10.3 |
| 32 | 8.07 | 8.63 | 7.11 | 7.56 | — | — | — | — | — | — |

*All % given on flour weight basis (baker's weight)

The above results demonstrated that SSL can increase the spread ratios of cookies of the regular and soy-fortified variety and can also reduce or spare the shortening required in such cookies. The sparing action is more pronounced with regular cookies than with soy-fortified cookies and with cookies containing less shortening than those containing more shortening.

It is well known in the art that the spread ratio of cookies can be increased with larger additions of shortening, but the finding that SSL could increase spread ratio and simultaneously spare shortening was highly unexpected. Therefore, additional baking tests were carried out to determine if the same results would be obtained using SSL in cookies prepared from three other flours (II, Arthur and Logan). These results are set forth in the right hand section of Table VII which The comparative effectiveness of calcium stearoyl-2-lactylate (CSL) as a shortening sparing additive was likewise tested in cookies in a manner identical with that described in Example III, using soft flour II. The spread ratios of the finished cookies are listed in Table IX and it can be seen that both CSL and SSL improve cookie quality, as shown by the spread ratios; however SSL is generally more effective for this purpose. Note also that the quality of cookies with 22% shortening and 0.5% SSL or CSL is better than that of cookies with 28% shortening and no additives.

TABLE IX*

| Shortening % | Additive % | Spread Ratio W/T |
|---|---|---|
| 22 | 0 | 8.30 |
| 22 | 0.25% SSL | 9.36 |
| 22 | 0.50% SSL | 10.24 |

TABLE IX*-continued

| Shortening % | Additive % | Spread Ratio W/T |
|---|---|---|
| 22 | 0.25% CSL | 9.12 |
| 22 | 0.50% CSL | 9.87 |
| 28 | 0 | 9.45 |

*All % given on flour weight basis (baker's weight)

Results tabulated in Table VIII substantiate the finding that SSL is effective in increasing cookie spread ratio with lesser amounts of shortening than with the amounts normally employed. However, while cookies fortified with 12% defatted soy flour exhibit increased spread ratios and a shortening sparing effect with addition of SSL, greater increases were observed in the unfortified cookies.

Unlike other parameters utilized to estimate cookie quality, cookie spread and thickness can be conveniently and accurately measured, and is therefore a standard of the art. However, the fundamental reasons for variations in spread and thickness are not fully understood. Variables include changes in quality and quantity of ingredients (flour, sugar, water, shortening, and baking powder) and in processing (mixing, sheeting, cutting, or molding).

Sodium stearoyl-2-lactylate is generally prepared by admixing lactic acid in an aqueous medium with commercial grade stearic acid (an admixture of myristic, palmitic and stearic fatty acids) at a sufficiently elevated temperature to remain in the molten condition. In general, 1.0 equivalent of fatty acids is used for each 1.2 equivalence of lactic acid as monomer for each lactyl group desired. In this case therefore, 2.4 equivalence of lactic acid are provided for each 1.0 equivalent of fatty acids. The mixture is stirred with heating whereupon about 1 equivalent of sodium hydroxide is added. The mixture is then heated to bring the temperature thereof up to about 200° C to complete the reaction. The reaction is carried out under an atmosphere of an inert gas to remove water vapor and prevent oxidation of the stearic acid. A solid, slightly cream colored material is produced upon cooling of the reaction products and it is then ground to a fine powder for use. The powder is a mixture of sodium salts of a homologous series of stearoyl lactylic acids, in which the number of lactyl groups in the molecules in a function of the relative ratios of the constitutents brought into the admixture. Calcium stearoyl-2-lactylate is prepared in a similar manner except that calcium carbonate is used as the neutralization agent.

The respective reaction mixture will contain unreactive lacetic acid and lacetylates, unreacted stearic acids, polylactylates and their salts. A specific procedure for producing sodium stearoyl-2-lactylate of which the numeral 2 indicates the average number of lactyl groups in the molecule, is set forth in detail in U.S. Pat. No. 2,789,922 insofar as stearoyl-2-lactylic acid ester is concerned and U.S. Pat. No. 2,733,252 which describes not only the preparation of sodium stearoyl-2-lactylate from stearic acid, sodium bicarbonate and lactylic acid, but also sets forth the parameters for production of the calcium lactylate composition. It is to be understood in this respect that although best results have been obtained using sodium stearoyl-2-lactylate, and to a slightly lesser degree calcium stearoyl-2-lactylate, other equivalent lactylates may be employed in this invention including those stearoyl lactylates (and particularly the sodium and calcium lactylates) having a different average number of lactyl groups in the molecule than is the case in the preferred lactylate additives specified herein. For example, the average number of lactyl groups can be less than 1.0 although a larger quantity of the additive must be employed for equivalent effectiveness. The specifications for the preferred acyl lactylate, sodium stearoyl-2-lactylate are set forth in Food Additive Regulation 21 CFR, Section 121.1211.

Having thus described the invention, what is claimed as new and desired to be secured by Letters Patent is:

1. In a method of preparing a wheat flour based, chemically leavened dough or batter wherein an amount of shortening is incorporated into the dough or batter to impart particular organoleptic properties to baked or fried goods derived therefrom, the improvement which comprises the steps of:

admixing the ingredients making up the chemically leavened dough or batter using a quantity of shortening therein which is from 12½ to about 35% less than the amount of shortening employed to give the baked or fried products derived from the dough or batter said particular organoleptic properties; and incorporating into the dough or batter ingredients in lieu of the shortening omitted, from about 0.1 to 3% (baker's weight) of an additive selected from the group consisting of the sodium and calcium salts of the acyl lactylates of $C_{14}$–$C_{22}$ fatty acids, the amount of said additive incorporated into said dough or batter being sufficient to maintain said particular organoleptic properties of said derived baked or fried goods at levels substantially equal to or exceeding those of baked or fried goods derived from an otherwise identical dough or batter containing said amount of shortening and being essentially free of said additive.

2. A method as set forth in claim 1 wherein said additive is sodium stearoyl-2-lactylate.

3. A method as set forth in claim 1, wherein said additive is calcium stearoyl-2-lactylate.

4. A method as set forth in claim 1 wherein said additive is incorporated into said ingredients in an amount of about 0.5% (baker's weight).

5. A method as set forth in claim 1 wherein a supplement which increases the protein content of said dough or batter is admixed with said ingredients.

6. A method as set forth in claim 5 wherein said protein supplement is selected from the group consisting of soy flour, soy isolates, nonfat milk solids, whey products, fish protein concentrate, cottonseed flour, chickpea flour, sesame seed flour, corn-soy-milk blend flour, wheat protein concentrate, wheat gluten, defatted wheat germ, Torula yeast, wheat-soy blend flour, edible single cell proteins, and mixtures thereof.

7. In a wheat flour based, chemically leavened dough or batter composition wherein an amount of shortening is present in the composition to impart particular organoleptic properties to baked or fried goods derived therefrom, the improved dough or batter composition which comprises:

an admixture of wheat flour and shortening and other ingredients necessary for said chemically leavened dough or batter composition, the quantity of shortening present in the latter being from 12½ to about 35% less than the amount of shortening employed to give said derived baked or fried products said particular organoleptic properties; and from about 0.1 to 3% (baker's weight) of an additive selected from the group consisting of the sodium and calcium salts of the acyl lactylates of $C_{14}$–$C_{22}$ fatty acids, the amount of said additive present in said dough or batter being sufficient to maintain said particular organoleptic properties of said derived baked or fried goods at levels substantially equal to or exceeding those of baked or fried goods derived from an otherwise identical dough or batter containing said amount of shortening and being essentially free of said additive.

8. The composition as set forth in claim 7 wherein said additive is sodium stearoyl-2-lactylate.

9. The composition as set forth in claim 7 wherein said additive is calcium stearoyl-2-lactylate.

10. The composition as set forth in claim 7 wherein said additive is present in an amount of about 0.5% (baker's weight).

11. The composition as set forth in claim 7 wherein a supplement which increases the protein content of said end products is present in said composition.

12. The composition as set forth in claim 11 wherein said supplement is selected from the group consisting of soy flour, soy isolates, nonfat milk solids, whey products, fish protein concentrate, cottonseed flour, chickpea flour, sesame seed flour, corn-soy-milk blend flour, wheat protein concentrate, wheat gluten, defatted wheat germ, Torula yeast, wheat-soy-blend flour, edible single cell proteins, and mixtures thereof.

* * * * *